Figure 8:
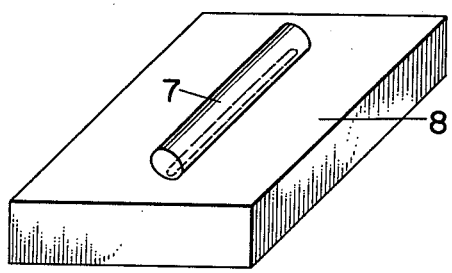
Figure 9:
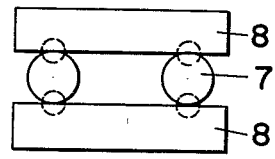

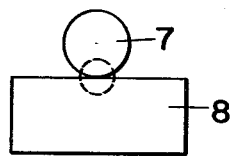
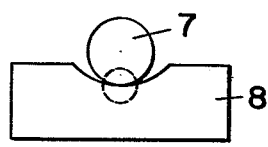
FIG. 1.   FIG. 2.
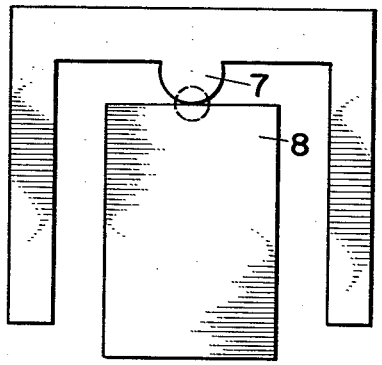
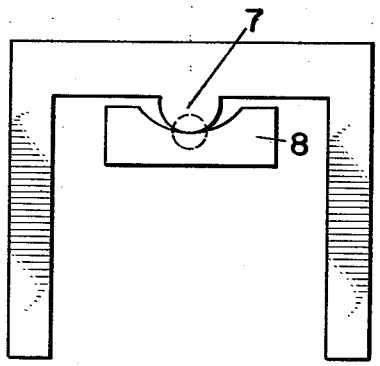
FIG. 3.   FIG. 4.
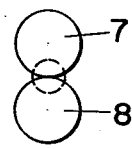
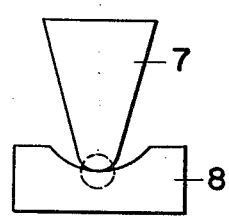
FIG. 5.   FIG. 6.
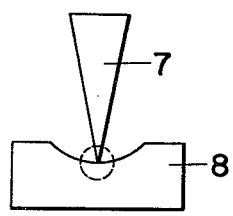
FIG. 7.
LEWIS R. PLUMB
LEONIDAS C. MILLER
INVENTORS Oct. 15, 1963     L. R. PLUMB ETAL     3,106,837
MEASURING METHOD USING HERTZ CONTACT REGIONS
Filed March 18, 1959     3 Sheets-Sheet 2

LEWIS R. PLUMB
LEONIDAS C. MILLER
INVENTORS

BY *Lyon r Lyon*

ATTORNEYS

United States Patent Office 3,106,837
Patented Oct. 15, 1963

3,106,837
MEASURING METHOD USING HERTZ
CONTACT REGIONS
Lewis R. Plumb, 1905 Merrill Road, Paradise, and Leonidas C. Miller, 5005 E. Stauson Ave., Los Angeles 22, Calif.
Filed Mar. 18, 1959, Ser. No. 800,128
9 Claims. (Cl. 73—67.2)

This invention relates to the use of a Hertz contact region as an element which stores energy in a system comprising masses and energy-dissipating elements, such system deriving is usefulness from its dynamic properties. The term "Hertz contact region" as used herein is intended to mean a region of matter which is so situated that it is subject to loads, and which because of its lack of infinite rigidity suffers strain as a result of these loads (or stresses) and thereby stores energy within itself, said region of matter being of a localized nature in comparison to the much larger remainder of the whole body of matter under consideration. This invention relates to a method using Hertz contact regions subjected to vibration for measuring loading or various properties of materials, and a number of specific illustrations are given.

Hertz contact regions may be developed between bodies having point or line contact or other forms of contact comprising a small area of contact relative to the size of the bodies or may exist in a single integral member having a particular intermediate portion of relatively small cross-sectional area as compared to the whole member, or between members fabricated into a single unit by a process such as welding wherein the welded junction is relatively small in cross-sectional area as compared to the members. For example, the regions adjacent the contact point between two spheres comprise Hertz contact regions whether the spheres are separate members or have been welded together. Moreover, Hertz contact regions can be devised by integrally joining variously shaped bodies.

It is to be noted that the magnitude of these strains or deformations which occur in Hertz contact regions is small when compared to the structural deformation such as occur in loaded beams of various configurations. However, the size of these deflections is not a factor in determining if a given configuration of matter falls within the scope of a Hertz contact region as defined above. A better measure is the existence of a localized stress concentration region which accompanies a localized strain region.

The resonant frequency of a system of mases joined by one or more Hertz contact regions varies with loading, geometry (conformity), hardness, surface finish and certain other variables. Accordingly, it is possible to measure any one of these variables by holding the others constant and by varying the frequency of excitation applied to the system of masses to determine the resonant frequency thereof.

Accordingly, an important object of this invention is to provide a novel method of measuring applied loads or measuring properties of metallic or non-metallic materials by vibrating a system of masses joined by one or more Hertz contact regions, to determine the resonant frequency of the system.

Another object of this invention is to provide means for accurately measuring the geometry of two bodies in contact, in particular to measure the fit of a ball or rolling element in a groove or track, such as the fit of a ball in the groove of a race as in a ball bearing.

Another object of this invention is to provide means of measuring the properties of material such as elastic modulus, Poisson's ratio, hardness, plastic flow rate, energy absorption (or damping capacity), fatigue limits, frictional characteristics and similar properties. Another object of this invention is to provide means of measuring the properties of fluids such as lubricating quality (or oiliness), energy absorption (or damping capacity), flow rates of thin films, energy storage capacity of thin films and similar properties.

Another object is to provide means for measuring loads or forces and for detecting flaws or defects in material, for measuring the surface finish of materials, for measuring dimensions with extreme accuracy, and for measuring certain characteristics of ball and roller bearing assemblies such as, for example, contact angle, load distribution among individual rolling elements, and total loading.

Other and related objects and advantages will appear hereinafter.

In the drawings:
FIGURES 1 through 9 illustrate the various forms of Hertz contact regions produced by contact between separate bodies.

Figure 15:
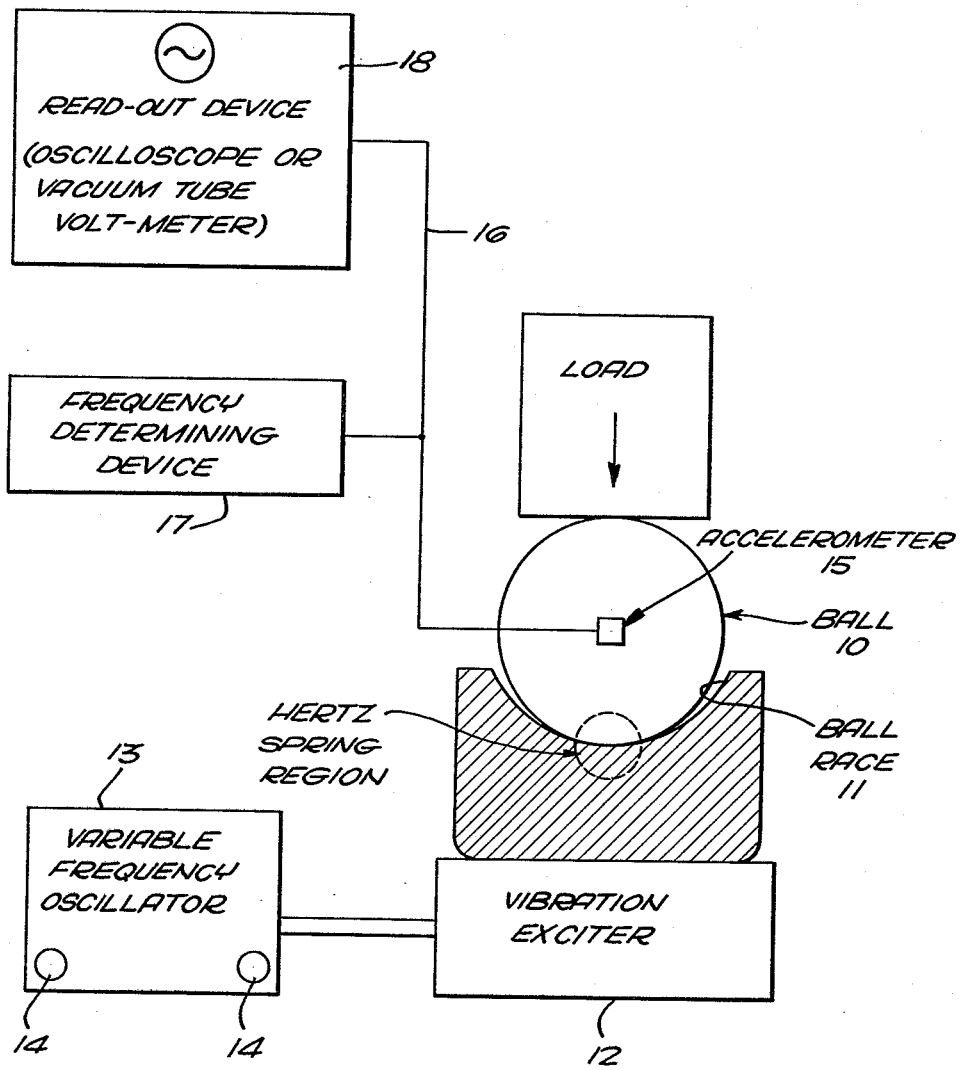

FIGURES 10 through 14 show various forms of Hertz contact regions utilizing a continuous mass system. FIGURE 15 shows a typical system used for measuring conformance of a ball to a ball race.

In all of these figures the localized Hertz regions are indicated by dotted lines. The contacting masses are indicated by the numerals 7 and 8 in each case.

Considering a ball bearing outer race and a ball of the type shown schematically in FIGURES 2 and 15, it can be shown that the resonant frequencies of the Hertz spring-mass systems depend upon the laod, the ball size, the groove radius, and to a lesser extent, on the diameter of the groove in the plane of the race, the material and the geometry of the surface.

The measuring apparatus includes a load of fixed magnitude applied to the ball 10. The combination of the load and the ball may be described as a probe 9. The ball rests in the outer race 11 of a ball bearing assembly. A vibration exciter 12 in contact with the ball race 11 is capable of imposing vibrations upon the ball race over a large range of frequencies. The load is used with the ball in order to maintain contact between the ball 10 and the race 11 during the vibration. Without a sufficient load or heavy ball, the vibrations used may be of such an amplitude and frequency as to cause the ball to bounce on the race 11 rather than producing the desired increasing and decreasing strain within the Hertz contact region. A variable frequency oscillator 13 is electrically connected to the vibration exciter 12 and is provided with manual control knobs 14 for controllably varying the frequency and amplitude of the vibration exciter over a wide range. An accelerometer 15 of conventional design is attached to the ball 10 or to the load and has an electrical lead 16 connected with the frequency determining device 17 and the read-out device 18. Both of these devices may be of conventional form, and the read-out device 18 may comprise either an oscilloscope or a vacuum tube voltmeter.

In the general plan of operation, the knobs 14 of the variable frequency oscillator 13 are turned manually to cause the vibration exciter 12 to apply vibrations to the ball race of gradually increasing (or decreasing) frequency, while the read-out device 18 is observed. When the desired resonant frequency of the system is reached the amplitude of the signal of the read-out device 18 increases to a marked extent, and the actual frequency value is then read from the frequency determining device 17. When the ball race 11 conforms closely to the ball 10, the resonant frequency is high. Conversely, when the shape of the ball race does not conform as closely to the ball, the resonant frequency is substantially lower.

Accordingly, a series of ball races may be readily checked in this way against results obtained with an acceptable standard race, using the same ball and same load.

It is clear that the resonant frequency will be affected if surface films such as oils are present in the contact region. Further analysis shows that the resonant frequency is quite sensitive to the groove radius and permits the accurate determination of the groove radius when the other factors are known from previous tests. Surface films must be controlled and the surface finish sufficiently good consistent with the probe weight chosen, in order to obtain consistent and dependable results.

It is important that the exciting vibration be held to a low level for two reasons. First, to avoid non-linear effects that make detection of a resonant frequency difficult, and second, to avoid damage to the race and ball by marking from "Brinnell" action. It has been found that from .01 to .15 g's force at maximum displacement for the amplitude at resonance is a convenient useful working range, although the lower limit may be reduced by improved instrumentation. It should be noted that these values apply to steady state sinusoidal excitation, but shock or impulse excitation can be used with no significant change in techniques.

A simple method for calibrating the apparatus of FIGURE 15 is to substitute a flat plate of the same material and finish for the race 11. Such an arrangement is shown diagrammatically in FIGURE 1. The sphere and the flat are perhaps the most accurate geometrical shape produced with modern machine techniques. When either the flat plate or the ball race is used it will be found that not all positions of the probe on the plate yield identical results. This is because the surface of the material does not have a perfectly uniform finish nor perfect material uniformity. In particular, even though cleaning be adequate, there exist rare points which are considerably different from normal. These are due to flaws under the surface, scratches, or hard or soft spots in the material. For example, a relatively hard spot in the material will result in a noticeably higher resonant frequency for the same load applied during testing than will result at normal or soft spots in the material. It is further found that the majority of the data from separate points form a statistical distribution and hence detection of these unusual spots is readily accomplished.

Certain desirable probe features are recognized. Thus, it is desirable that the center of gravity of the probe be located near the contact point of the ball and race. Experimental evidence shows that the exact placement of the ball in the lowest point of the race is not required for good results. This is because the tangential stresses induced in the Hertz contact region when the probe is displaced laterally from the natural rest position of a freely rolling ball do not change the stiffness of the contact to a degree sufficient to prevent accurate measurement of the groove radius.

Vibration excitation may conveniently be accomplished by electro-magnetic devices, piezoelectric, magnetostrictive, or the so-called loud speaker construction using a voice coil, and the like. The vibration energy can be transmitted to the specimens being tested by a number of means such as solid body transmission, air (sound wave) transmission, magnetic coupling, electrostatic coupling, magnetostrictive coupling.

The detection of the vibration can be accomplished by a number of known means, such as capacitance variation, magnetic variation, dielectric or magnetic loss variations, sound produced by the vibrating probe, or piezoelectric means. The piezoelectric means is well adapted for use because of its high sensitivity in readily available devices. Since care must be exercised in maintaining a known load on the ball when extreme accuracy is desired, the location of the piezoelectric accelerometer on the probe requires either flimsy leads, or some other method of avoiding variation in load. It is important that any resonances be avoided within the probe, races or vibration exciter which would be near the resonance of the Hertz contact region.

This method can be applied to small bearings with no loss in accuracy, a circumstance quite unlike the limitations imposed on known methods of measurement. The use of the probe permits measurement with equal ease on inner or outer races, since the ball (which cannot rotate) is held in position by friction as long as an approximate location is maintained within reasonable limits. A singular advantage of this method is that the determination at a point is accomplished, not an average as obtained by other methods.

The amplitude at resonance gives information concerning the energy absorption of the contact and is a good detector of the presence of oil or other films and of quality of the material.

It will be understood that the method may also be used for the sole purpose of the measurement of load. In such case the applied load varies, while all other physical properties remain constant. Any of the types of contact shown in the drawings producing Hertz spring regions may be used. It has been found that by careful attention to detail involving the shape of the Hertz contact region that a wide variety of load-frequency relations can be obtained. In particular, a very useful device has a load-frequency relation which is linear. This is accomplished by shaping the Hertz contact region so that its spring rate increases in the following fashion:

$$\frac{dP}{dS_n} = C_2 P^2$$

where:

$dP$ = Incremental load change.
$dS_n$ = Incremental displacement resulting from $dP$.
$C_2$ = A constant, depending on material and geometry.
$P$ = Total load carried by Hertz contact, or contacts.

It is also possible to maintain constant the frequency of the vibration exciter 12 while checking different items of load. If each item produces the same resonant frequency under the same excitation, then the items have the same loading effect. Moreover, the weights of a plurality of items can be checked accurately against known standards by varing the excitation frequency.

Figure 10:
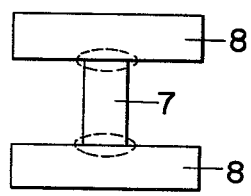
Figure 11:
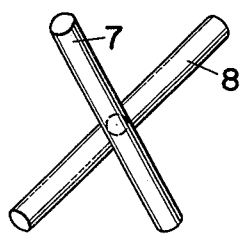
Figure 12:
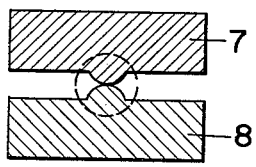
Figure 13:
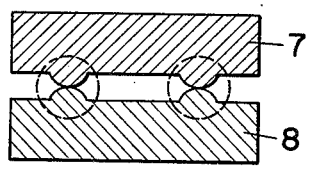
Figure 14:
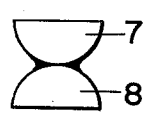

It is further possible to measure such properties of bodies as flatness. In FIGURE 10 there is shown apparatus where a variable load can be placed on a test specimen supported between two masses with inwardly facing flat faces. If the test block is not flat, the frequency-load characteristics curve will contain a sharp break which indicates the load required to bring the test specimen into flatness information regarding the nature of the surfaces can be readily obtained by this procedure.

This invention has made it possible to supplement available knowledge on certain properties of material, which properties have been difficult or impossible to measure accurately. In order to reach a clear understanding and to show how measurement can be accomplished, it is necessary to define these properties of material for purposes of this explanation. Therefore, plastic flow rate is defined as the rate at which stiffness of a Hertz contact region increases (or decreases) with time. When no significant foreign surface films are present, this is a property of the materials used, while the presence of fluid films greatly modifies both the magnitude of the stiffness variations and the rate at which they occur. In general, good lubricating materials have slow flow rates and large stiffness changes, while poor lubricants have relatively slight effect, and the basic materials govern. When fluids are present, a quality commonly called "oiliness" is believed to be a governing factor. In any event, the suitability of the fluid for lubrication of the boundary type can be readily determined by measuring its effect on stiffness and energy absorption in a Hertz contact region. For example, a ball acting as a probe, placed on a flat plate which has a film of fluid to be measured constitutes a very useful test apparatus. It is to be noted that properties of relatively thin film can be evaluated as contrasted to the usual hydrodynamic type of test for thin films. This use of measuring plastic flow rates constitutes a very important use of this invention. In particular, it allows examination of bearing materials and lubricants in convenient adhesive fashion with the purpose of determining suitability for use in bearings where dimensional changes of small magnitude are not allowable, such as precision gyroscope devices. This method gives accuracy and sensitivity previously lacking. Because oiliness is an important part of the plastic flow rate (it is usually many times greater than the basic material flow rate), oiliness is defined as that property in a lubricant which produces an increase in the stiffness of a Hertz contact.

Material such as water and ether have zero oiliness by this measure, while good bearing oils will increase the stiffness of a Hertz contact region by as much as 150%. In addition to these effects, the amount of damping or energy-loss caused by the oil film gives an indication of the relative degree of friction torque that can be expected when this fluid is used in the bearing.

In addition to the measurement of plastic flow rate, an added feature of the method described is the determination of the limiting load which can be imposed upon a Hertz contact region. For example, the static capacity of a ball race contact can be related to the time stabilized contact stiffness. This will permit ready checking of this property, which is now loosely defined and rarely measured, due to the great care that must be taken in the testing. The facility of this vibration method will be apparent to persons skilled in the art.

Having fully described our invention, it is to be understood that we do not wish to be limited to the details herein set forth, but our invention is of the full scope of the appended claims.

We claim:

1. The method of measuring a physical property of a material, comprising: placing two masses in contact with each other at a relatively small area, the portions of said masses adjoining said contacting area forming a Hertz contact region and including the material desired to be measured; applying a load to develop a stress in the Hertz contact region; inducing vibration in the masses to vary said stresses cyclically; and determining the resonant frequency of the masses by observing their amplitude of vibration, said amplitude being greatest at said resonant frequency.

2. The method of claim 1 in which variable frequency excitation is employed for inducing the vibration while the load is held substantially constant.

3. The method of claim 1 in which excitation of substantially constant frequency is employed for inducing the vibration, while the load is varied.

4. The method of claim 1 in which excitation is provided for inducing vibration and wherein the load and excitation frequency are both varied.

5. The method of measurement of a property of a fluid comprising: placing two masses in contact with each other at a relatively small area, the portions of said masses adjoining said contacting area forming a Hertz contact region; positioning said fluid in contact with said Hertz contact region; inducing vibration in said masses; and determining the resonant frequency of the masses by observing their amplitude of vibration, said amplitude being greatest at said resonant frequency.

6. The measurement of the conformance of a ball to a ball race, comprising: placing the ball in contact with the ball race so that a Hertz contact region is formed in that portion of both the ball and ball race surrounding said contact therebetween; exciting the ball or ball race to induce vibration therein; and determining the resonant frequency of said ball and ball race by observing their amplitude of vibration, said amplitude being greatest at said resonant frequency, said resonant frequency being a function of the conformance of said ball to said ball race.

7. The method of measurement of the conformance of a ball to a ball race, comprising: placing the ball in contact with the ball race so that a Hertz contact region is formed in that portion of both the ball and ball race surrounding said contact therebetween; applying a force to load the ball; exciting the ball or ball race to induce vibration therein toward and away from said contact while maintaining said contact; varying the frequency of excitation to vary the frequency of vibration of said ball and ball race; and determining the resonant frequency of said ball and ball race by observing their amplitude of vibration, said amplitude being greatest at said resonant frequency, said resonant frequency being a function of the conformance of said ball to said ball race.

8. The method of measurement of the conformance of a ball to a ball race, comprising: placing the ball in contact with the ball race so that a Hertz contact region is formed in the portion of both the ball and the ball race surrounding said contact therebetween; applying a force to load the ball; exciting the ball or ball race to induce vibration therein toward and away from said contact while maintaining said contact; varying the load applied to said ball; and determining the resonant frequency of said ball and ball race by observing their amplitude of vibration, and amplitude being greatest at said resonant frequency, said resonant frequency being a function of the conformance of said ball to said ball race.

9. The method of measurement of the conformance of a ball to a ball race comprising: placing the ball in contact with the ball race so that a Hertz contact region is formed in the portion of both the ball and the ball race surrounding said contact therebetween; applying a force to load the ball; exciting the ball or ball race to induce vibration therein toward and away from said contact while maintaining said contact; varying the frequency of excitation to vary the frequency of vibration of said ball and ball race; varying the load applied to said ball; and determining the resonant frequency of said ball and ball race by observing their amplitude of vibration, said amplitude being greatest at said resonant frequency, said resonant frequency being a function of the conformance of said ball to said ball race.

References Cited in the file of this patent

UNITED STATES PATENTS

| | | |
|---|---|---|
| 2,468,648 | Abbott et al. | Apr. 26, 1949 |
| 2,787,905 | Prestipino et al. | Apr. 9, 1957 |
| 2,903,886 | Renaut | Sept. 15, 1959 |